(12) United States Patent
Salvatori et al.

(10) Patent No.: US 7,246,908 B2
(45) Date of Patent: Jul. 24, 2007

(54) COMBINATION CONTROL FOR A PROJECTION DEVICE

(75) Inventors: Phillip H. Salvatori, Salem, OR (US); Danny Han, Tigard, OR (US); Robert Gainer, Newberg, OR (US)

(73) Assignee: Infocus Corporation, Wilsonville, OR (US)

( * ) Notice: Subject to any disclaimer, the term of this patent is extended or adjusted under 35 U.S.C. 154(b) by 75 days.

(21) Appl. No.: 11/129,562

(22) Filed: May 13, 2005

(65) Prior Publication Data

US 2006/0066822 A1 Mar. 30, 2006

Related U.S. Application Data

(60) Provisional application No. 60/614,119, filed on Sep. 28, 2004.

(51) Int. Cl.
*G03B 21/00* (2006.01)
*G03B 21/14* (2006.01)
*G03B 21/20* (2006.01)
*G03B 21/22* (2006.01)

(52) U.S. Cl. .................. 353/69; 353/70; 353/101; 353/102; 353/119

(58) Field of Classification Search .................. 353/69, 353/70, 97, 100, 101, 102, 119; 348/745, 348/806; 352/140
See application file for complete search history.

(56) References Cited

U.S. PATENT DOCUMENTS

| | | | |
|---|---|---|---|
| 6,592,228 B1* | 7/2003 | Kawashima et al. | 353/101 |
| 6,962,417 B1* | 11/2005 | Teng et al. | 353/70 |
| 7,090,360 B2* | 8/2006 | Kuroda et al. | 353/119 |
| 2005/0099609 A1* | 5/2005 | Masuzawa et al. | 353/101 |
| 2005/0122483 A1* | 6/2005 | Yamasaki et al. | 353/69 |

* cited by examiner

*Primary Examiner*—Melissa Jan Koval
(74) *Attorney, Agent, or Firm*—Alleman Hall McCoy Russell & Tuttle LLP

(57) ABSTRACT

A projection device is provided. In one embodiment, the projection device may include an optical system mounted within the projection device and having an optical system axis substantially parallel to the optical system. The projection device further may include a combination control operatively coupled to the optical system and having a control axis that is non-parallel to the optical system axis.

30 Claims, 7 Drawing Sheets

COMBINATION CONTROL FOR A PROJECTION DEVICE

CROSS-REFERENCE TO RELATED APPLICATIONS

This application claims priority from U.S. Provisional Patent Application Ser. No. 60/614,119 of Phillip H. Salvatori, Danny Han, and Robert Gainer, for a COMBINATION CONTROL FOR A PROJECTION DEVICE, filed Sep. 28, 2004, the disclosure of which is hereby incorporated by reference in its entirety and for all purposes.

TECHNICAL FIELD

The present disclosure relates generally to adjustment mechanisms for various devices, including adjustment mechanisms for projection devices.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION

Figure 1:
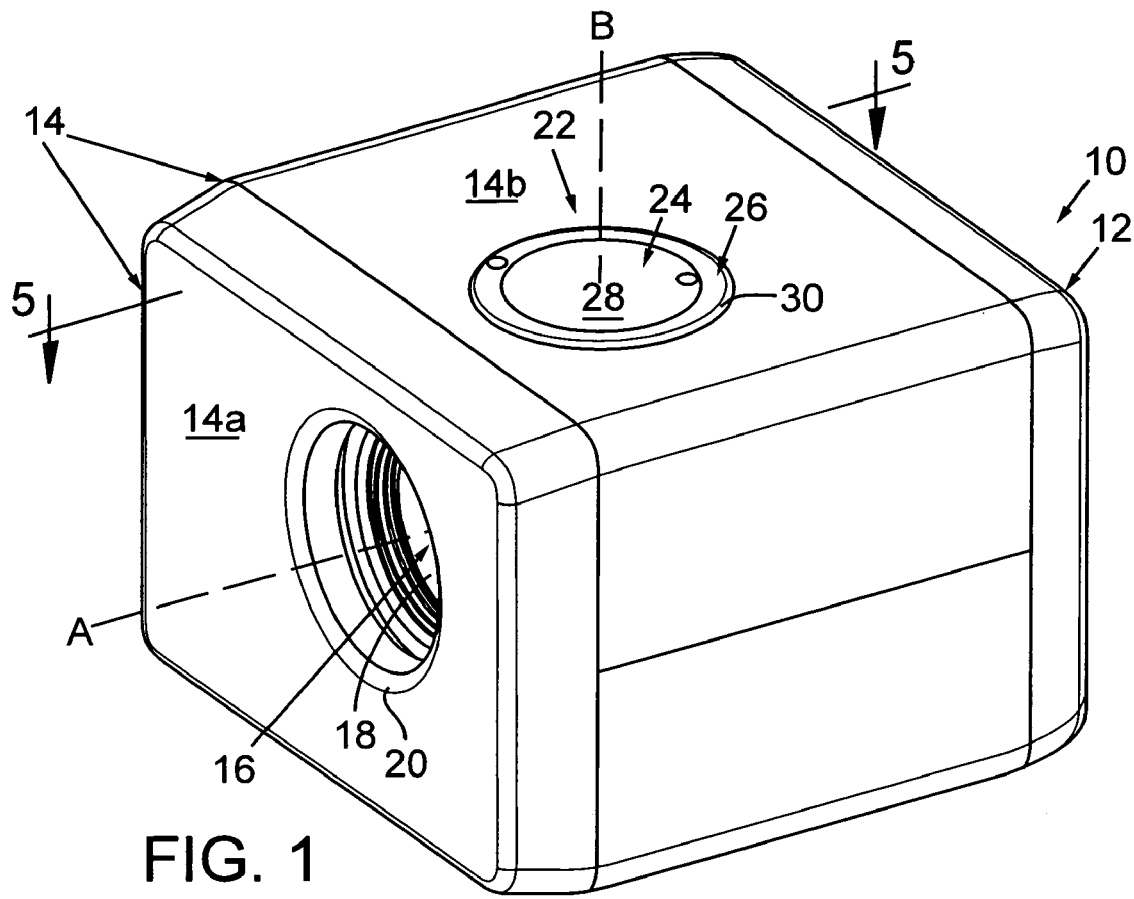
FIG. 1 is a schematic illustration of an exemplary projection device in which a combination control of the present disclosure may be implemented.
Figure 2:
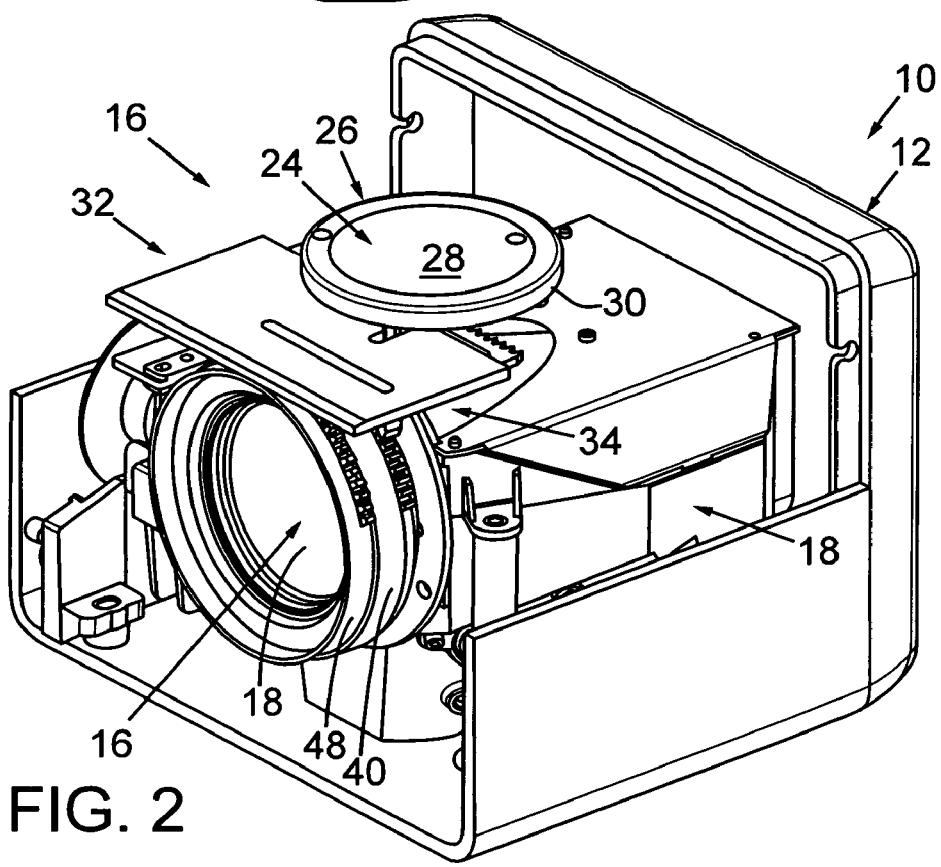
FIG. 2 is an isometric top view of the projection device of FIG. 1 showing the interior of the projection device including an optical system.

An exemplary projection device 10 is illustrated in FIG. 1. Projection device 10 may be adapted to project an image on a display or viewing surface (not shown), including, but not limited to, a screen, a wall, or other viewing surface or area. As used herein, a projection device may include any suitable display device or image projector, including, but not limited to, a digital projector, a liquid crystal display (LCD) projector, a digital light processing projector, a rear projection device, a front projection device, etc.

As shown in FIG. 1, exemplary projection device 10 typically includes a body or housing 12. Housing 12 may be any suitable shape. For example, housing 12 is shown as a box, such as a cubical box. However other shapes are possible, including but not limited to, flat box shapes, triangular housings, circular housings, trapezoidal housings, and any other suitable shape. As shown, housing 12 includes a plurality of sides or surfaces 14, including a front side 14a and a top side 14b. Although shown as having six sides, housing 12 may have any number of sides.

Contained within housing 12 may be an image-generation device 16 that includes a light source (not shown) and an optical system 18. The light source may be adapted to produce a beam of light and project the light towards optical system 18. Optical system 18 may be configured to generate and project the light through opening 20 in a side, such as front side 14a, of the housing to produce an image on a display surface.

In some embodiments, the light source may include a lamp positioned within a reflector that is configured to direct most of the emitted light along an optical path. The light further is directed through the optical system out of the projection device where the path through the optical system out of the projection device may be considered the system axis A—A. The light source may include any suitable type of lamp. Examples include, but are not limited to, metal halide lamps and ultra-high-pressure (UHP) arc lamps, lasers, light emitting diodes (LED), etc. The system also may include one or more filters, such as an infrared (IR) or ultraviolet (UV) filter, to filter out unwanted parts of the emission spectra of the lamp.

The optical system may be configured to receive the light from the light source and generate an image to be projected. The optical system may include an optical engine, image-producing element, filters, color wheels, lenses, mirrors, prisms, integrators, condensers, and other suitable optical elements. Such elements may be configured to generate an image. For example, the optical system may include an image-producing element, such as, but not limited to, a digital micromirror (DMD), an LCD panel, or any other suitable image source. In some embodiments, the image-producing element may be configured to project light toward one or more lenses, mirrors or other optics, which, in turn, may be configured to project light toward a display or viewing surface. Thus, projection device 10 is configured to generate and project an image on a display surface.

Optimization of the appearance of a projected image may require adjustment of a number of projection device settings. Thus, in some embodiments, projection device 10 may include various controls to adjust parameters of optical system 18. Adjustment of optical system 18 may be desired based on the type of image, the source of the image, the size of the image, etc. To make these adjustments, a user may be required to access individual settings via one or more menu systems and/or make manual adjustments to the projection device. The adjustments may be difficult to access and/or be located in different positions on the projection device.

To assist a user in adjusting the optical system, a combination control 22 may be provided. The combination control may be adapted to link two or more controls, or adjusters, together, such as a first adjuster 24 and a second adjuster 26. By localizing the two or more controls together, a user may immediately access the controls without having to search for the individual controls on the projection body. In contrast to projection devices where the various adjustment mechanisms (adjusters) may be placed in different locations on the projection device, localized controls, such as the disclosed combination control may be easier to use. Moreover, such a combination control may make adjusting the displayed image faster.

Further, the combination control 22 may be placed in an easy-to-reach location, such as top side 14b, or any other suitable location or side, including the front side, the rear side, etc. By disposing the combination control 22 in an easy-to-reach location it may be possible to decrease the time required for adjustment of the projection device necessary to optimize the projected image. For example, ease-of-use of the combination control may be extended by positioning the controls on the exterior of the projection device housing (in contrast to a configuration which requires a user to manipulate his or her fingers through an opening in the side of the housing in order to reach the controls).

In some embodiments, the combination control may improve ease-of-use by its position on the top side of the projection device. A top side configuration may be particularly useful for a user who is not familiar with the projection device because the user may easily see and identify the combination control and how it operates. Moreover, a top side location may enable a user to reach the control without extending his or her arm around the projection device which, in some projection devices, may disrupt the display of the image.

Moreover, in some projection devices the optical system controls, such as for focus and zoom, are disposed on the front side of the projection device around an end of optical system 18 extending through opening 20. Such a configuration may require extension of the optical system away from the body of the projection device in order to provide room for a user to adjust controls. For example, one or more lens groups may need to project beyond the body or housing of the projector where the controls are on the lens or lens group and adjustment requires manual adjustment or rotation of the lens or lens group. In such a configuration, the optical system may extend outwards away from the housing. An extended optical system may be vulnerable to breakage or other damage when dropped or otherwise abused.

In contrast, in some embodiments of the present disclosure, it may be selected to dispose the adjusters away from opening 20, thus enabling the optical system to be recessed within housing 12. No extension of the optical system is necessary, as access to the adjusters does not require direct manual access to the optical system.

A configuration that recesses the optical system and/or the controls within the housing may decrease the risk of damage to the device due to abuse or accidents. For example, if the optical system is recessed within the housing, it may be less likely that the optical components will be scratched or otherwise damaged if the device falls or is knocked off a support surface, such as a table.

Additionally, in some projection devices, a lens cap may be used to protect the lens portion that extends beyond the body of the projection device. In the present disclosure, in some embodiments, where the lens portion may be recessed or substantially contained within the projection device body, a lens cap may not be needed. For example, in some embodiments, a shutter may be used instead. This reduction in components may reduce the costs of the projection device and may reduce the risk of losing the unattached components.

To further limit damage to components of projection device 10, combination control 22 may be recessed within housing 12. For example, the top surface of combination control 22 may be coplanar or substantially coplanar with the corresponding surface of the housing, such as top side 14b.

As shown in FIGS. 1–5, combination control 22 may take the form of a dual control having a first adjuster, such as an inner dial 28, and a second adjuster, such as an outer dial 30. Inner dial and outer dial are exemplary user-manipulable portions of the first and second adjuster and other user-manipulable portions are possible and are within the scope of the disclosure. Inner dial 28 may be used to adjust a first parameter of the optical system, such as to change the focal length of the optical system to focus a projected image. Outer dial 30 may be used to adjust a second parameter of the optical system, such as to change the magnification, or zoom, of a projected image. Thus, in some embodiments, inner dial 28 may adjust focus and outer dial 30 may adjust zoom, or vice versa. It should be appreciated that the functions of these controls are not limited to that of focus and zoom as numerous other parameters may be controlled. Additionally, combination control 22 may include more than two adjustment mechanisms. For example, the combination control may further include a control to adjust the angle at which the image is projected through opening 20.

The adjusters of the combination control may be configured to be adjusted independently. Thus, a user may selectively adjust the first adjuster without effecting the adjustment of the second adjuster, or vice versa. For example, a user of the combination control including a zoom control and a focus control may selectively adjust the zoom without adjusting the focus. Likewise, a user of the combination control may selectively adjust the focus without adjusting the zoom. Further, the user may selectively adjust both the focus and the zoom.

It should be appreciated that the location of the adjusters may be altered, or even reversed, and they may take any suitable form. Thus, although shown as dials, other types of control mechanisms may be provided, including, but not limited to, knobs, levers, switches, buttons, etc. For example, combination control 22 may take the form of sliding bars that may be translated or otherwise moved to make select adjustments. In other embodiments, the combination control may include a joystick-type mechanism that may be biased to return to a neutral position.

FIGS. 2–5 illustrate the interior components of an exemplary projection device 10. As shown, image-generation device 16 may include an intermediate region 32 that connects combination control 22 with optical system 18. Intermediate region 32 may include any components suitable to transmit user inputs from the combination control to the optical system. Although illustrated as a gear assembly 34, it should be appreciated that the intermediate region may include belt drives, electronic controls, or any other suitable mechanism to operatively couple the combination control to the optical system. In some embodiments, the intermediate region may be a direct coupling between the combination control and the optical system, while in other embodiments, various structures may be used to translate motion from the user-adjustable control to the optical system.

Figure 3:
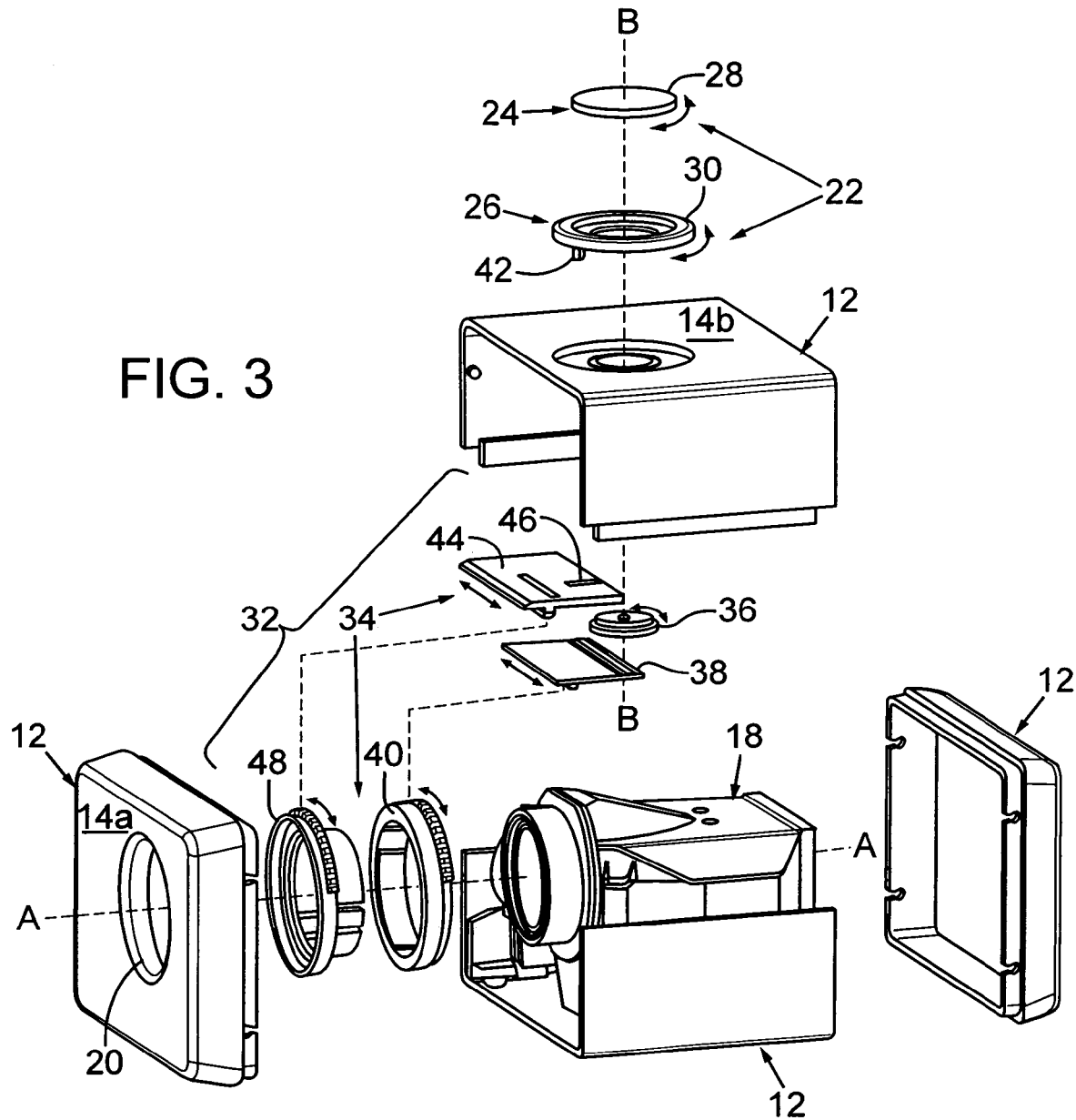
FIG. 3 is an exploded view of the projection device of FIG. 2 including a combination control axis and an optical system axis.

Exemplary projection device 10 is shown in exploded view in FIG. 3. In the exemplary embodiment, a first adjuster 24 may include or be configured to rotate a gear assembly. The gear assembly of first adjuster 24 (as well as second adjuster 26 (described below)) may enable select adjustment of a lens or group of lenses, without requiring a user to manually engage the lens or group of lens. For example, first adjuster 24 may include or be operatively coupled to a disk gear 36, which may be configured to engage and move a toothed plate 38. Translation of plate 38 may result in rotation of gear 40, which may adjust a parameter of optical system 18, such as to focus the projected image. The above-mentioned gears may include gear teeth configured to engage one another to enable adjustment of a lens or a group of lenses. Coarse or fine adjustment may be possible through the combination control by varying the gear assembly, the gear teeth, the linkages, the gear size, etc.

An exemplary second adjuster 26 is shown with a protrusion 42 that may be configured to engage a toothed plate 44, via slot 46. As the second adjuster is rotated, plate 44 may slide sideways such that the teeth on the bottom surface of the plate engage with teeth on a gear 48. The engagement of the gear teeth may result in rotation of the gear and, thus, adjustment of a parameter of optical system 18. For example, the second adjuster may be used to shrink or enlarge the projected image by controlling the zoom. It should be understood that gear 40 and gear 48 may be a lens, a group of lenses, a coupling to a lens or group of lens, etc. Although first adjuster and second adjuster are shown as having different gear assemblies, first adjuster and second adjuster may both have the same gear assembly configuration. Further first adjuster 24 may have the gear assembly discussed in regards to second adjuster 26 and vice versa.

It should be appreciated that any suitable gearing mechanism or combination of gearing assemblies or the like may be used to rotate or adjust the zoom, focus or other adjustable parameter. For example, a rack and pinion system may be used to convert rotary motion of the adjustment dial to linear motion of a plate. The rack may be considered the plate and the adjustment dial (or other linked gear) may be considered the pinion. The diameter of the gear may determine the amount of adjustment along the rack.

First adjuster 24, second adjuster 26 and disk gear 36 may form an axis of rotation, herein referred to as control axis B—B (shown in FIGS. 1 and 3). Although second adjuster 26 is shown as being concentric with the first adjuster, it should be appreciated that these controls may take other forms that place the controls adjacent one another.

As shown, control axis B—B may be substantially non-parallel to optical system axis A—A. In other words, control axis B—B may be off-set or off-axis from optical system axis A—A. In the illustrated embodiment, control axis B—B is substantially perpendicular to optical system axis A—A. Although shown where control axis A—A is perpendicular to optical system axis A—A, other off axis configurations are considered, including, but not limited to 45 degrees off-axis, 60 degrees off-axis, 90 degrees off-axis, 120 degrees off-axis, 135 degrees off-axis, 180 degrees off-axis, 200 degrees off-axis, 270 degrees off-axis, etc.

The off-axis configuration of the combination control may provide greater freedom in placement of combination control 22 since intermediate region 32 may be configured in a variety of ways to locate combination control 22 on any desirable side 14 of the housing. The ability to position the combination control off-axis may enable use of more gears or different types and sizes of gears. For example, additional gears may be added to further change the orientation of the combination control relative to the optical system. Further, the size of the gears may be altered to adjust the sensitivity of the controls. For example, if disk gear 36 is enlarged circumferentially, fewer rotations of inner dial 28 are required by a user to manipulate gear 40 to adjust a parameter of the optical system.

Figure 4:
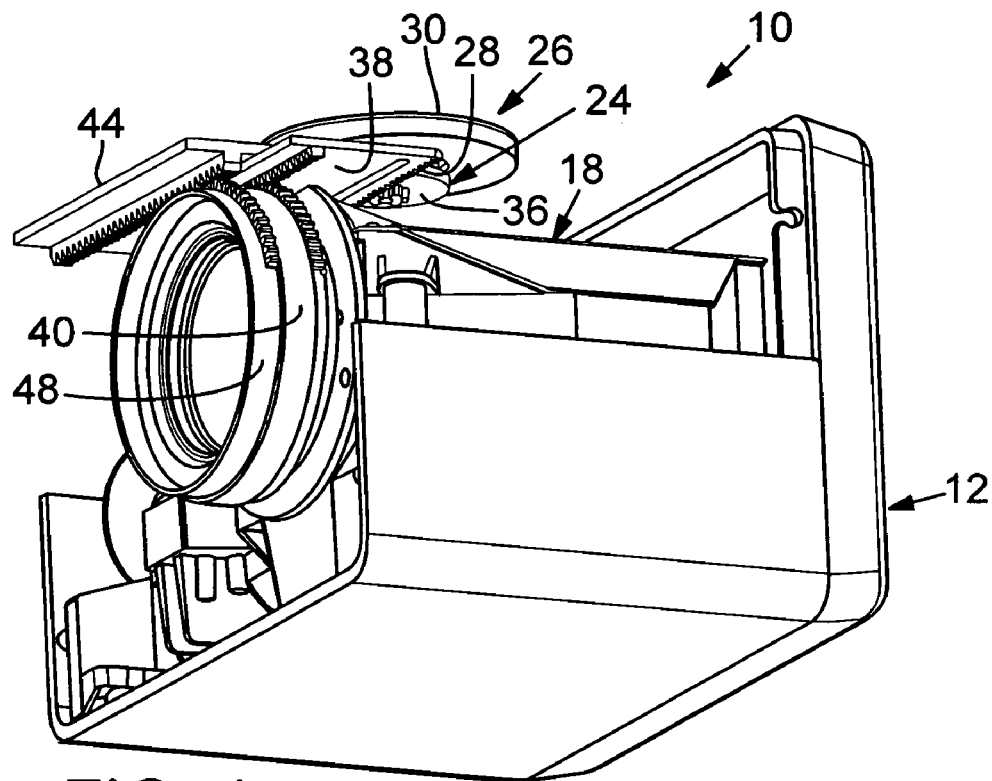
FIG. 4 is an isometric partially cut-away bottom view of the projection device of FIG. 2 showing engagement of the combination control with the optical system via an intermediate region.
Figure 5:
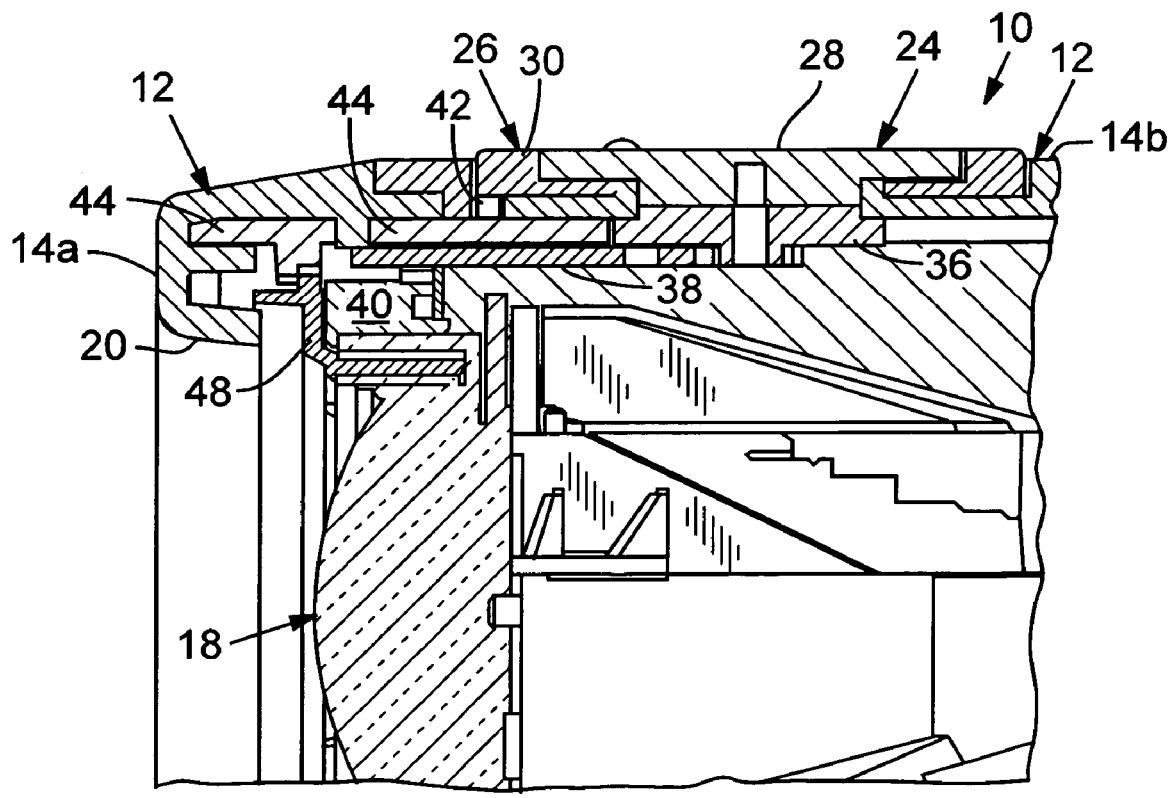
FIG. 5 is a cross-sectional view of the projection device of FIG. 1 along line 5—5.

FIGS. 4 and 5 show further details of intermediate region 32. It should be noted that other configurations are possible and are within the scope of this disclosure. Specifically, FIG. 4 illustrates the engagement of the teeth of plate 44 engaging gear 48. Gear 48 may be integrated with or coupled to a lens, or group of lenses, which may enable adjustment of a select parameter. Similarly, FIG. 4 further illustrates first adjuster 24, linked to disk gear 36, which is configured to engage plate 38. Teeth on plate 38 may be configured to engage gear 40, which as described above in regards to gear 48, may be integrated or coupled to a lens or groups of lenses.

Figure 6:
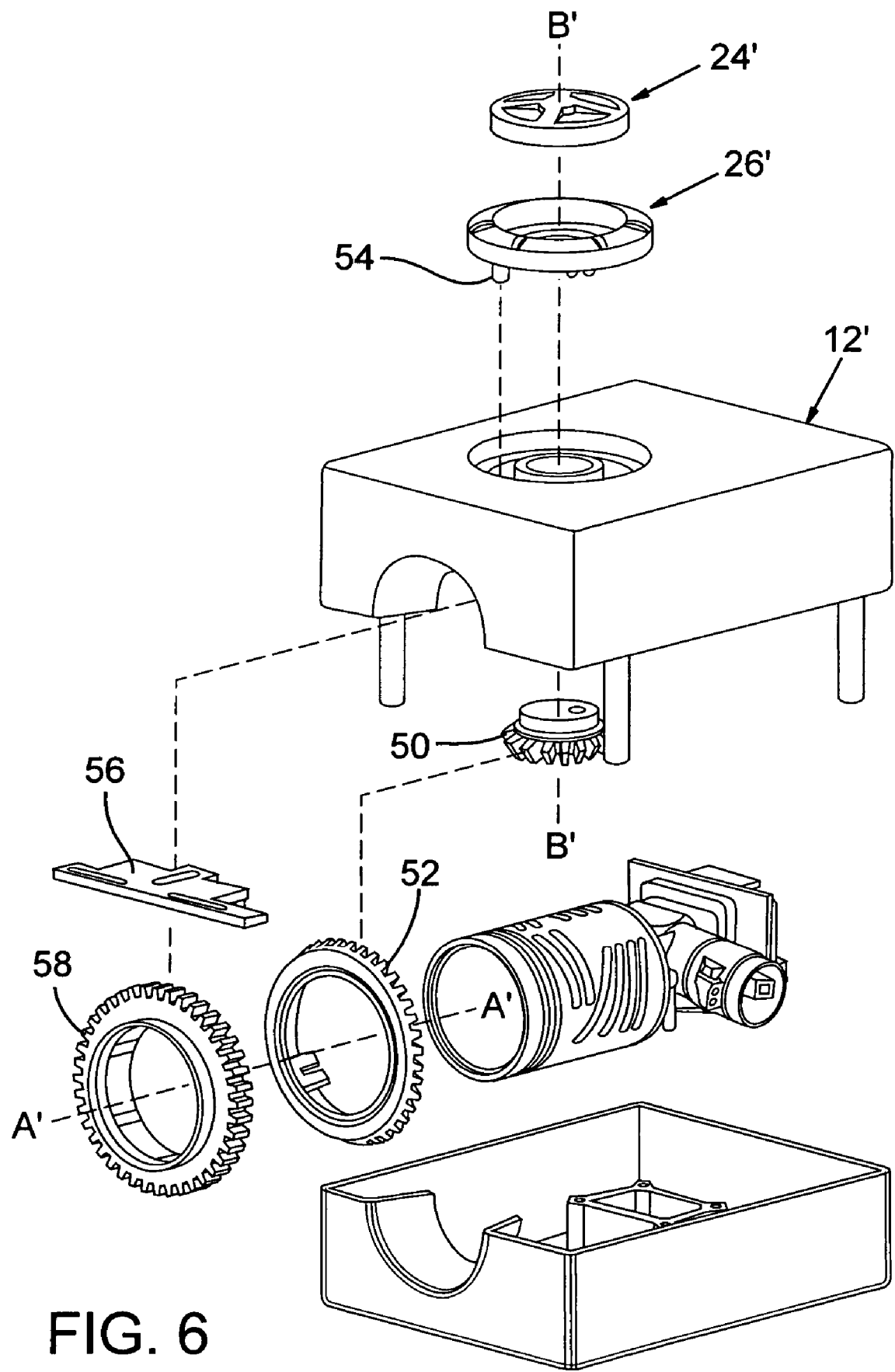
FIG. 6 is an exploded view of another exemplary projection device having an alternative intermediate region.

FIG. 6 is an exploded view of an alternative exemplary projection device with a first adjuster 24' engaging a gear 50 which, in turn, engages against the lens or gear 52. In some embodiments, lens 52 may be linked to one or more additional lenses. Rotation of first adjuster 24' results in rotation and adjustment of lens 52 to adjust the zoom and/or focus of the optical system.

In addition to first adjuster 24', FIG. 6, also illustrates a second adjuster 26'. Second adjuster 26' is shown with a tooth 54 that may be configured to engage plate 56. As described above, plate 56 may include teeth or other operative-coupling mechanism such that plate 56 engages gear or lens (or group of lenses) 58. Rotation of second adjuster 26' may enable select adjustment of lens 58. As described above, control axis B'—B' is off axis from optical system axis A'—A'. Although control axis B'—B' is shown as perpendicular to optical system axis A'—A', other suitable off-axis configurations are possible.

Figure 7:
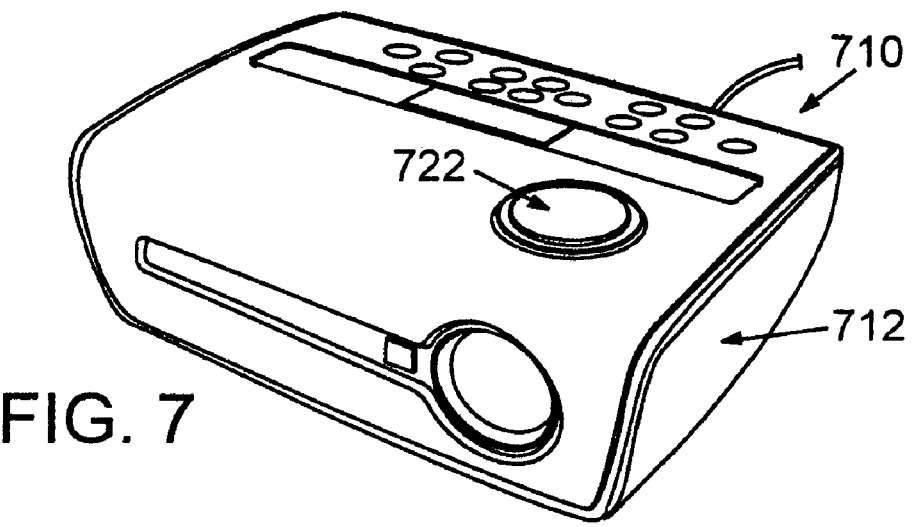
FIGS. 7–9 illustrate various projection devices showing exemplary placement of the combination control on the projection devices.
Figure 8:
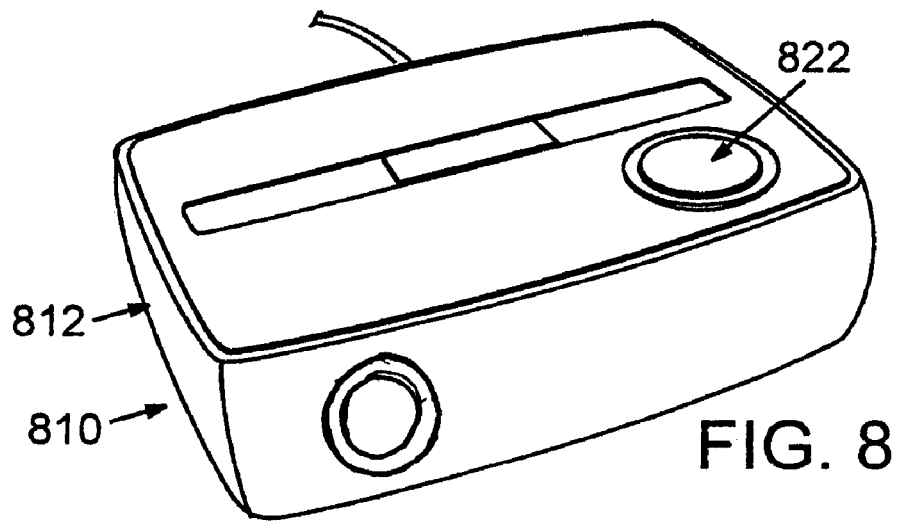
Figure 9:
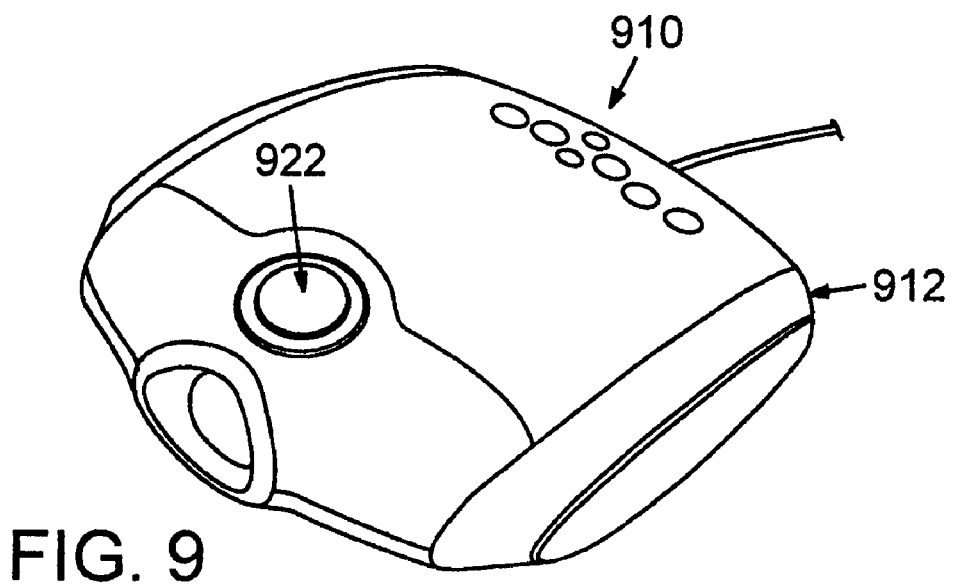

FIGS. 7–9 illustrate exemplary projection devices with a combination control as described above. Specifically, FIG. 7 illustrates an exemplary projection device 710 with a body 712 and a combination control 722 disposed on a top surface. The axis of combination control 722 is disposed substantially perpendicular to the axis of the optical system shown on the front side of projection device 710. Moreover, the combination control 722 is in line or substantially coplanar with the vertical plane of the optical system.

FIG. 8 shows another exemplary projection device 810 with body 812. A combination control 822 is shown disposed on a top surface off-set from an optical system shown on the front side of the projection device. In general, an "off-set" combination control is not positioned directly above the optical system, and in some embodiments, the off-set combination control may be positioned relatively distant from the optical system. In "off-set" configurations, the control axis may be configured such that it does not intersect the optical system axis. Off-set combination controls can be positioned so that a projection of the control axis onto a plane through which the optical axis passes (such as a vertical plane extending from the back to the front of a projector) is perpendicular to the optical axis. In some embodiments, such a projection may be parallel to the optical axis, and in some embodiments, such a projection may be skewed relative the optical axis (i.e., neither perpendicular to nor parallel to the optical axis). When such a projection is skewed relative the optical axis, the combination control can be referred to as being off axis, even though the control axis and the optical axis are not in the same plane and do not intersect.

The ability to off-set the combination control from the optical system provides greater flexibility in machine design. Combination controls may be off-set to improve ease-of-use, reduce the amount of heat the combination control receives from a light source of the optical system, or for virtually any other reason. Any suitable intermediate region (such as the intermediate region 32 described above) may be used to operatively couple the combination control to the off-set optical system.

FIG. 9 illustrates another exemplary configuration for a projection device. Specifically, a projection device 910 is shown with a body 912 and a combination control 922. The combination control is shown disposed substantially above the optically system. It should be appreciated that the top surface (or top side) of body 912 may be angled referenced to the front side or surface. Thus, the axis of the combination control 922 may be at an angle other than 90 degrees to the axis of the optical system. For example, and not as a limitation, the axis of combination control 922 may be 50 degrees, 70 degrees, 80 degrees, 100 degrees, 110 degrees, and so forth from the axis of the optical system.

Figure 10A:
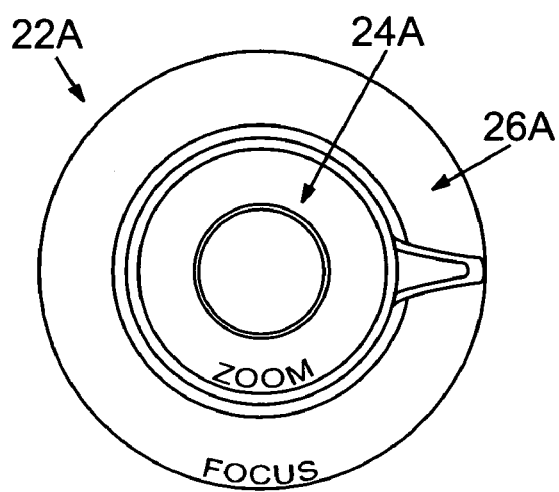
FIGS. 10–11 illustrate exemplary combination controls.
Figure 10B:
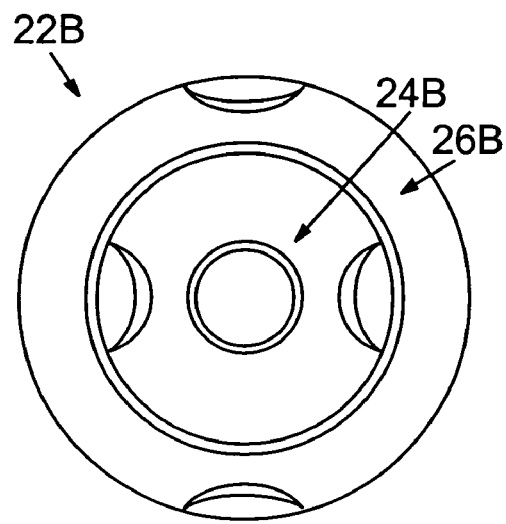
Figure 10C:
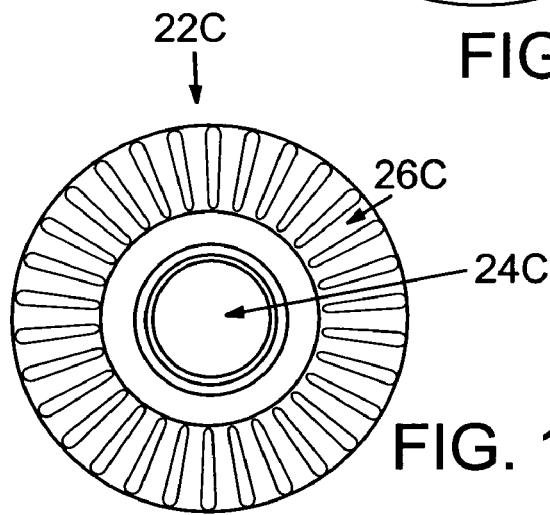
Figure 10D:
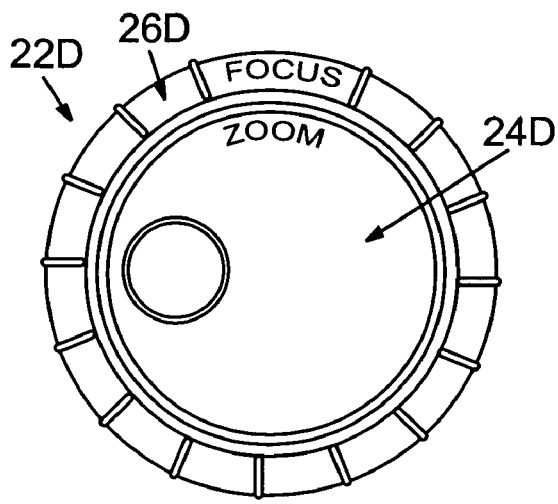
Figure 10E:
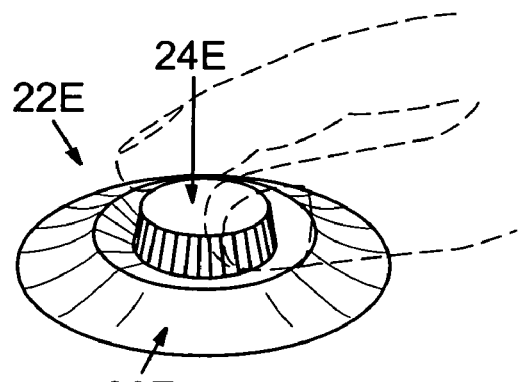
Figure 10F:
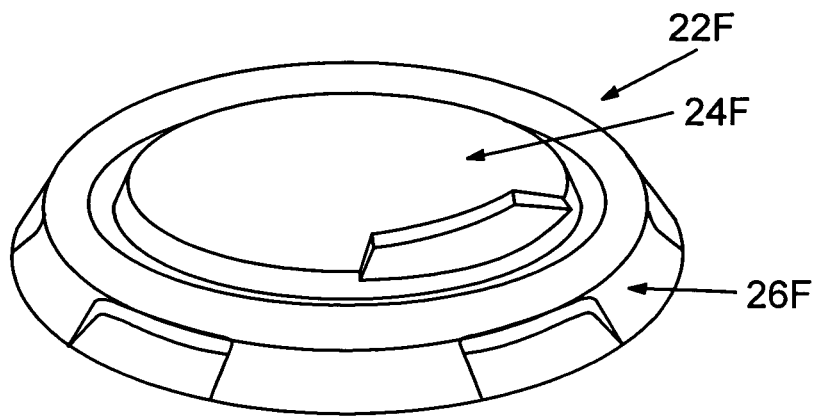
Figure 10G:
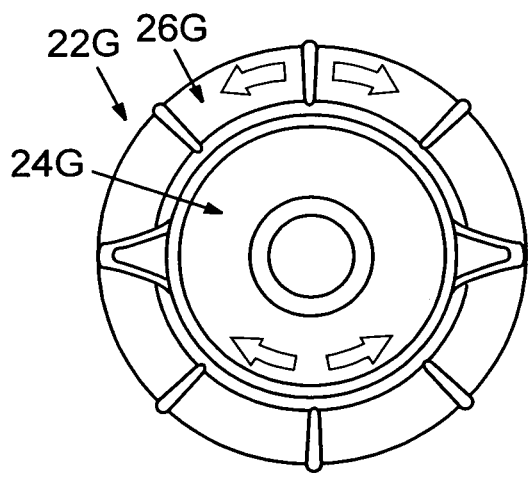
Figure 10H:
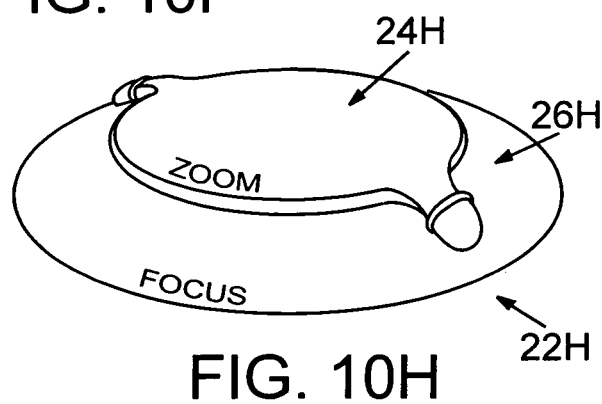
Figure 10I:
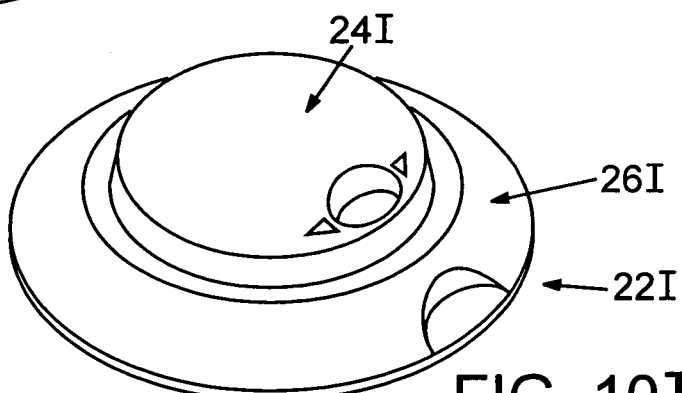
Figure 11:
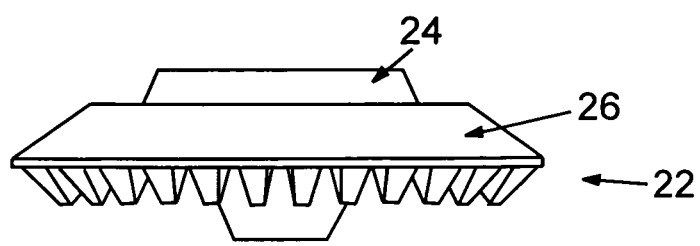

FIGS. 10 and 11 further illustrate various embodiments for a combination control. Such embodiments are provided as examples and are not intended to be limiting in any sense. As illustrated in FIG. 10A, combination control 22A, includes an inner dial 24A and an outer dial 26A. A projection may be provided on inner dial 24A to provide ease of rotation of inner dial 24A relative outer dial 26A. Although shown with a zoom control internal of a focus control, it should be appreciated that the controls may be disposed such that the zoom control is outside of the focus control. Moreover, combination control 22A may be used to adjust other suitable parameters.

FIG. 10B illustrates another embodiment of an exemplary combination control 22B. Combination control 22B includes an inner dial 24B and an outer dial 26B. Various grips or other handling features may be provided on one or both of the inner dial and the outer dial to enable easier rotation of the dials. In some embodiments, the combination control may be substantially coplanar with the surface of projection device. Such a coplanar configuration may prevent damage to the device if the device is dropped or otherwise abused.

FIG. 10C shows another combination control 22C. Combination control 22C includes an inner dial 24C and an outer dial 26C. Outer dial 26C is shown with ribs or spokes to enable easy engagement and use of the dial. Although shown with ribs, other suitable features are possible, including, but not limited to, detents, knobs, protrusions, extensions, slots, indentations, grooves, arms, etc. Moreover, in some embodiments, one or both of the dials may be biased to a preset location. A lock, such as a friction lock, may be provided to secure one or more dials in a select location. Upon release, the dial may be biased back to the preset location. Any suitable biasing mechanism may be provided, including, but not limited to a spring, etc.

FIG. 10D illustrates another combination control. Combination control 22D may include an inner dial 24D with an aperture or indent configured to enable easy adjustment of inner dial 24D. An outer dial 26D may also be provided with various gripping features. Although shown with a zoom control internal of a focus control, it should be appreciated that the controls may be disposed such that the zoom control is outside of the focus control. Moreover, combination control 22D may be used to adjust other suitable parameters.

Another combination control 22E is provided in FIG. 10E. Inner dial 24E, includes a rotatable knob 24E with an external ring or dial 26E. Similarly, another embodiment for a combination control 22F is provided in 10F with an inner dial 24F and an outer dial 26F.

FIG. 10G provides another exemplary combination control 22G including an inner dial 24G and an outer dial 26G. Arrows or other indicia may be provided to indicate direction of rotation for adjustment of one or more of the dials.

Another illustration of a combination control is shown in FIG. 10H. Specifically, a combination control 22H is shown with an inner raised dial 24H and an outer focus dial 26H. Although shown with a zoom control internal of a focus control, it should be appreciated that the controls may be disposed such that the zoom control is outside of the focus control. Moreover, other types of controls may be substituted for or used in addition to the zoom and/or focus control.

FIG. 10I is another illustration of an exemplary combination control 22I. Combination control 22I, may include an inner dial 24I and an outer dial 26I. In some embodiments, the dials may be configured to move independently with each other. In other embodiments, the dials may be configured to rotate with or move together during an operation or shut-down stage. Further the dials may be locked together or locked independently depending on the configuration of the system.

It should be appreciated that any suitable mechanical or electrical mechanism may be used to link the adjusters to the optical system. Further although dials are illustrated, the user manipulable portions may be other mechanical structures or electrical structures, including touch pads, etc.

FIG. 11 provides a side view of an exemplary combination control 22. An inner dial 24 may be at least partially encircled by an outer dial 26. As shown, outer dial 26 may include engagement teeth configured to engage an intermediate region and/or the optical system directly. It should be appreciated that each of the combination controls are exemplary and features of the exemplary controls may be interchanged with features of other combination controls. Additionally, although the illustrated combination controls depict two dials operatively linked, three or more dials may be used without departing from the scope of the disclosure. Further, although shown as rotary controls, alternative configurations, including lever devices, handles, buttons, etc. may be used and are within the scope of the disclosure.

As described above, the following is provided as a non-limiting example: a projection device comprising an optical system mounted within the projection device and having an optical system axis substantially parallel to a portion of the optical system, and a combination control coupled to the projection device and having a control axis that is off-axis to the optical system axis.

The combination control may include a first adjuster adapted to alter a first parameter of the optical system and a second adjuster adapted to alter a second parameter of the optical system. The first parameter may be the focal length of the optical system. The combination control may be adapted to rotate around the control axis. The control axis may be substantially perpendicular to the optical system axis. The intermediate region may be adapted to operatively couple the combination control to the optical system. The intermediate region may include a gear assembly configured to transmit a user input from the combination control to the optical system. The optical system may be recessed within the projection device.

Also provided is a projection device comprising an image-projection device having an intermediate region and an optical system; a first control; and a second control coupled to the first control, wherein the first control and the second control are operatively coupled to the intermediate region. The first control and the second control may be concentric. The intermediate region may include a gear assembly adapted to transfer movement of the first control and the second control to the optical system.

Also provided is a projection device comprising: a body; an optical system housed by the body and adapted to project an image out of a first side of the body; and a combination control including a first control and a second control adapted to adjust the optical system, wherein the combination control is located on a second side of the body that is different from the first side.

The first side and the second side may be substantially perpendicular to one another. The second side may correspond to a top side of the body. The combination control may be coplanar with a side of the body. The optical system may be recessed within the body away from the first side.

Although the combination control is discussed above for use on a projection device. It should be appreciated that the combination control may be used for other suitable electronic devices.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A projection device comprising:
    an optical system mounted within the projection device and having an optical system axis; and
    a combination control operatively coupled to the optical system, the combination control including at least two different user-manipulable controls having parallel control axes that are non-parallel to the optical system axis.

2. The projection device of claim 1, wherein the control axes are substantially perpendicular to the optical system axis.

3. The projection device of claim 1, wherein the combination control includes a first adjuster and a second adjuster, wherein one of the first adjuster and the second adjuster is a zoom control and the other of the first adjuster and the second adjuster is a focus control.

4. The projection device of claim 1, wherein the combination control includes a first adjuster and a second adjuster wherein the first adjuster is independently adjustable relative the second adjuster.

5. The projection device of claim 1, wherein the combination control is adapted so that both user-manipulable controls rotate around the same control axis.

6. The projection device of claim 1, wherein the combination control includes at least one adjuster with a gear assembly linked to a lens.

7. The projection device of claim 6, wherein the combination control includes an adjuster that is operatively linked to a disk gear that is operatively linked to a lens.

8. The projection device of claim 7, wherein the combination control includes an adjuster that is operatively linked to a slidable plate that is operatively linked to a lens.

9. The projection device of claim 1, wherein the combination control includes an inner dial and an outer dial.

10. The projection device of claim 1, wherein the optical system includes a lens disposed on a first side and a combination control disposed on a second side.

11. The projection device of claim 10, wherein the first side is a front side and the second side is a top side.

12. The projection device of claim 1, wherein the combination control is off-set from the optical system.

13. The projection device of claim 1, wherein the control axes are skewed relative the optical axis.

14. A projection device comprising:
    an image-generation device including a light source and an optical system including a projector lens; and
    a combination control positioned apart from the projector lens and including a zoom control operatively coupled to the optical system and a focus control substantially adjacent to the zoom control and operatively coupled to the optical system, wherein the zoom control and the focus control are concentric.

15. The projection device of claim 14, wherein one of the zoom control and the focus control is an inner dial and the other of the zoom control and the focus control is an outer dial.

16. The projection device of claim 14, wherein the zoom control and the focus control rotate about a control axis.

17. The projection device of claim 16, wherein the control axis is off-set from an optical system axis.

18. The projection device of claim 16, wherein the control axis is substantially perpendicular to the optical system axis.

19. The projection device of claim 16, wherein the control axis is skewed relative the optical axis.

20. The projection device of claim 14, further comprising an intermediate region configured to operatively couple the focus control and the zoom control to the optical system.

21. The projection device of claim 20, wherein the intermediate region includes a gear assembly adapted to transfer movement of the zoom control and the focus control to the optical system.

22. The projection device of claim 20, wherein the intermediate region is adapted to transmit user inputs to the optical system.

23. A projection device comprising:
    a body;
    an optical system mounted within the body and adapted to project an image through an opening in a first side of the body; and
    a combination control disposed on a second side of the body, wherein the combination control includes a first adjuster and a second adjuster, where the first adjuster and the second adjuster are concentric.

24. The projection device of claim 23, wherein the first adjuster is a zoom control and the second adjuster is a focus control.

25. The projection device of claim 23, wherein the first side of the body is a front surface.

26. The projection device of claim 23, wherein the second side of the body is a top surface.

27. The projection device of claim 23, wherein the first side and the second side are substantially perpendicular to one another.

28. The projection device of claim 23, wherein the combination control is substantially coplanar with the second surface.

29. The projection device of claim 23, wherein the combination control is off-set from the optical system.

30. The projection device of claim 23, wherein the control axis is skewed relative the optical system.

* * * * *